Patented May 14, 1940

2,200,336

UNITED STATES PATENT OFFICE 2,200,336

COMPOSITION FOR TREATING SILK GOODS TO PREVENT RUNNING

Dave Mack Jenkins, Gary, Ind., assignor to Bernice H. Lowther

No Drawing. Application August 1, 1938, Serial No. 222,445

9 Claims. (Cl. 134—18)

This invention relates to a method of treating silk goods and the like and a composition therefor. More particularly, it relates to a method of protecting natural or artificial silk fabrics against runs by treatment with an aqueous composition comprising alum and rock salt.

It has heretofore been proposed to treat silken textile fabrics with an aqueous solution of magnesium sulfate, alum and rock salt, to preserve such fabrics against runs. Another proposal discloses a composition for treating rayon hose to prevent runs therein comprising water, alum, salt, boric acid, gum arabic and casein.

I have discovered that while these aqueous solutions comprising alum and rock salt are effective to some extent in preserving silk or rayon hose against runs, yet a far more effective prevention can be brought about at a much lower cost by treating such hose with a dilute aqueous solution of alum and rock salt to which an amount of ammonia has been added substantially in excess of that required to react with all the aluminum sulfate present to form aluminum hydroxide.

It is therefore an important object of this invention to provide an improved method of treating silk goods and the like, to prevent runs therein as well as to provide a composition therefor.

Another important object of this invention is to provide a novel method of protecting natural and artificial silk fabrics against runs by treatment with a dilute aqueous solution of alum and rock salt to which an amount of ammonia has been added in excess of that required to react with all of the aluminum sulfate present to form aluminum hydroxide.

Other and further objects of this invention will be apparent from the following description and appended claims.

In proceeding in accordance with my invention, a suitable aqueous alum-rock salt solution is first prepared by mixing, for instance, one pound of alum and one pound of rock salt with four gallons of hot water, stirring for five minutes and adding twenty-six gallons of cold water. To the resulting solution one pint of 28% aqueous ammonia is then added. If desired, one ounce of extract of cedar may be added to mask the faint ammonia smell of the solution, which is then stirred for five minutes.

Hose and socks are treated with a solution such as the one whose preparation is described in the preceding paragraph by being soaked therein, suitably for about one-half hour. A temperature of about 75° to 85° F. has been found particularly suitable for this soaking, although other temperatures are permissible. If desired, the hose may be rinsed or washed with luke-warm soap water after soaking. One quart of the solution described will suffice for the treatment of eight to ten pairs of ladies' hose.

The following experiment will illustrate the striking effect of the treatment just described in preventing runs. Using three pairs of rayon hose of the quality commonly sold at retail for 25 cents a pair, one pair was not treated, a second pair was soaked for one-half hour at 75° to 85° F. in one quart of a solution of one pound of alum and one pound of rock salt in thirty gallons of water to which one ounce of extract of cedar had been added, while the third pair was treated according to my invention. The second and third pairs were washed with luke-warm soap water after the treatment indicated, rinsed and dried. An examination of the three pairs of hose revealed that the first pair developed runs with great ease, the second pair did not run quite as easily, the threads therein requiring a slight effort for rupturing, while in the case of the third pair a considerable pull, accompanied by twisting of the threads, was necessary to cause them to rupture and start a run.

The above-indicated composition is a preferred embodiment of my invention, which can be modified in many details relating to the amount, nature and order of incorporation of the ingredients, without departing from the principles of this invention. Many variants of my invention will suggest themselves to those skilled in the art after reading my disclosure. It is possible, for instance, to substitute for alum aluminum sulfate, aluminum acetate or other soluble aluminum salts, with or without the addition of sulfates such as those of sodium, potassium or magnesium; the place of the rock salt may be taken by appropriate amounts of soluble alkali metal or alkaline earth metal chlorides or sulfates; ammonium carbonate may replace part or all of the ammonia; it is even possible to substitute sodium hydroxide or sodium carbonate for that part of the ammonia which would form ammonium sulfate when added to the aluminum sulfate solution; in other words, alkaline compounds other than ammonium compounds may be substituted for the latter, but only to such an extent that the final basicity of the solution is not changed thereby.

The maximum excess of ammonia found desirable is less than that theoretically required to convert all the aluminum hydroxide to ammonium aluminate.

The concentration of the solution is not critical and may be varied within wide limits. The total amounts of salts added other than aluminum salts should preferably not be substantially less than the amount of aluminum salts added, but may greatly exceed the latter.

The most important factor appears to be the provision of the presence, in the solution, of aluminum hydroxide in an environment equivalent to that furnished by the ammoniacal salt solution described. The added disclosures in the preceding paragraphs will enable those skilled in the art to prepare such equivalent solutions with the minimum of experimentation along lines obvious to those skilled in the art which is unavoidable in adjusting the various factors indicated.

It will therefore be seen that I have disclosed an improved method of treating silk and rayon fabrics to preserve them against runs, which method comprises soaking, spraying or otherwise treating such fabrics with an aqueous composition comprising the reaction products of a soluble aluminum salt and an amount of a soluble alkaline substance not exceeding that theoretically required to convert all the aluminum to aluminum hydroxide, an amount of a basic ammonium compound theoretically insufficient to convert all of the aluminum from aluminum hydroxide to ammonium aluminate, and a salt selected from the group consisting of soluble alkali metal and alkaline earth metal chlorides and sulfates.

Without in any manner conditioning the merits of my invention upon the correctness of the following hypothesis, I offer as one possible explanation of the functioning of my composition the absorption of aluminum hydroxide by the silk or rayon fibers in conjunction with and affected by a simultaneous action on the fibers by the slightly basic ammoniacal salt solution in which the aluminum hydroxide is probably partially colloidally suspended and partially flocculated. It would seem reasonable to believe that the ammoniacal salt solution causes the aluminum hydroxide to assume a physical form facilitating its absorption by the textile fibers and that the solution also furnishes an environment whose basicity and other conditions favor absorption, besides probably having an independent effect on the textile fibers.

I am aware that many changes may be made and numerous details may be varied through a wide range without departing from the principles of this invention, and I therefore do not purpose limiting the patent granted hereon otherwise than necessitated by the prior art.

I claim as my invention:

1. An aqueous composition for protecting natural and artificial silk fabrics against runs which comprises a salt selected from the group consisting of soluble alkali metal and alkaline earth metal chlorides and sulfates, the reaction products of a soluble aluminum salt and the exact amount of soluble basic substances theoretically necessary to convert said aluminum salt completely to aluminum hydroxide, and a substantial amount of a basic ammonium compound, said amount being less than that theoretically required to completely convert said aluminum hydroxide to ammonium aluminate.

2. An aqueous composition for protecting natural and artificial silk fabrics against runs equivalent to an aqueous composition comprising approximately equal parts by weight of alum and rock salt to which has been added ammonia in an amount in excess of that theoretically required to completely convert the aluminum contained in said alum to aluminum hydroxide but theoretically insufficient to completely convert said aluminum to ammonium aluminate.

3. An aqueous composition for protecting natural and artificial silk fabrics against runs comprising a soluble aluminum salt and an amount of rock salt at least equal thereto in weight to which composition has been added ammonia in an amount intermediate to that theoretically required to completely convert said aluminum salt to aluminum hydroxide and that theoretically required to completely convert said aluminum salt to ammonium aluminate.

4. An aqueous composition for protecting natural and artificial silk fabrics against runs comprising aluminum sulfate and an amount of rock salt at least equal thereto in weight to which composition has been added ammonia in an amount intermediate to that theoretically required to completely convert said aluminum sulfate to aluminum hydroxide and that theoretically required to completely convert said aluminum sulfate to ammonium aluminate.

5. An aqueous composition for protecting natural and artificial silk fabrics against runs comprising alum and an amount of rock salt at least equal in weight to said alum to which composition has been added approximately one pint of 28% ammonia for each pound of alum.

6. An aqueous composition for protecting natural and artificial silk fabrics against runs comprising aluminum sulfate and an amount of rock salt at least equal in weight thereto to which composition has been added approximately 2/3 pint of 28% ammonia for each pound of aluminum sulfate.

7. In an aqueous composition for protecting natural and artificial silk fabrics against runs, which composition comprises alum and rock salt, the additional ingredient consisting of ammonia in an amount theoretically more than sufficient to completely convert said alum to aluminum hydroxide but theoretically insufficient to completely convert said alum to ammonium aluminate.

8. An aqueous composition for protecting natural and artificial silk fabrics against runs comprising a suspension of aluminum hydroxide containing ammonia and a salt selected from the group consisting of soluble alkali metal and alkaline earth metal chlorides and sulfates.

9. A composition adapted to protect natural and artificial silk fabrics against runs which comprises a salt selected from the group consisting of alkali metal and alkaline earth metal chlorides and sulfates, and aluminum hydroxide dispersed in an aqueous medium alkalinized with a basic ammonium compound.

DAVE MACK JENKINS.